United States Patent [19]

Pincetich

[11] 4,255,036
[45] Mar. 10, 1981

[54] HANDHELD SUPPORT FOR CAMERA AND PHOTOGRAPHIC LAMP

[76] Inventor: Vincent J. Pincetich, 18332 Lahey St., Northridge, Calif. 91324

[21] Appl. No.: 42,316

[22] Filed: May 25, 1979

[51] Int. Cl.³ .......................................... G03B 17/56
[52] U.S. Cl. ................................................. 354/293
[58] Field of Search ................. 248/179, 183; 354/81, 354/126, 132, 145, 290, 293, 295; 352/243

[56] References Cited

U.S. PATENT DOCUMENTS

| | | | |
|---|---|---|---|
| 1,828,541 | 10/1931 | Meletio | 354/295 |
| 3,213,749 | 10/1965 | Hanks | 354/293 X |
| 3,550,519 | 12/1970 | Lewis | 354/293 |
| 3,575,098 | 4/1971 | Jones | 354/293 |
| 3,650,195 | 3/1972 | Jones | 354/293 |
| 3,781,535 | 12/1973 | Larson | 354/126 |
| 3,855,602 | 12/1974 | Hoos | 354/293 |
| 4,091,402 | 5/1978 | Siegel | 354/293 |
| 4,104,623 | 8/1978 | Sloop | 354/293 |

Primary Examiner—Donald A. Griffin
Attorney, Agent, or Firm—Fulwider, Patton, Rieber, Lee & Utecht

[57] ABSTRACT

A support for a camera and photographic lamp includes a vertical center section, a horizontal arm extending from the top of the center section to support the lamp, and a pivotable base plate that supports the camera beneath the lamp. The base plate can be secured in either a horizontal or a vertical position giving the camera two possible orientations displaced by ninety degrees to take best advantage of a rectangular film format. The positions of the light and camera on the support are adjustable permitting a relationship in which the lamp is centered on the camera in both camera orientations.

3 Claims, 5 Drawing Figures

U.S. Patent  Mar. 10, 1981  4,255,036
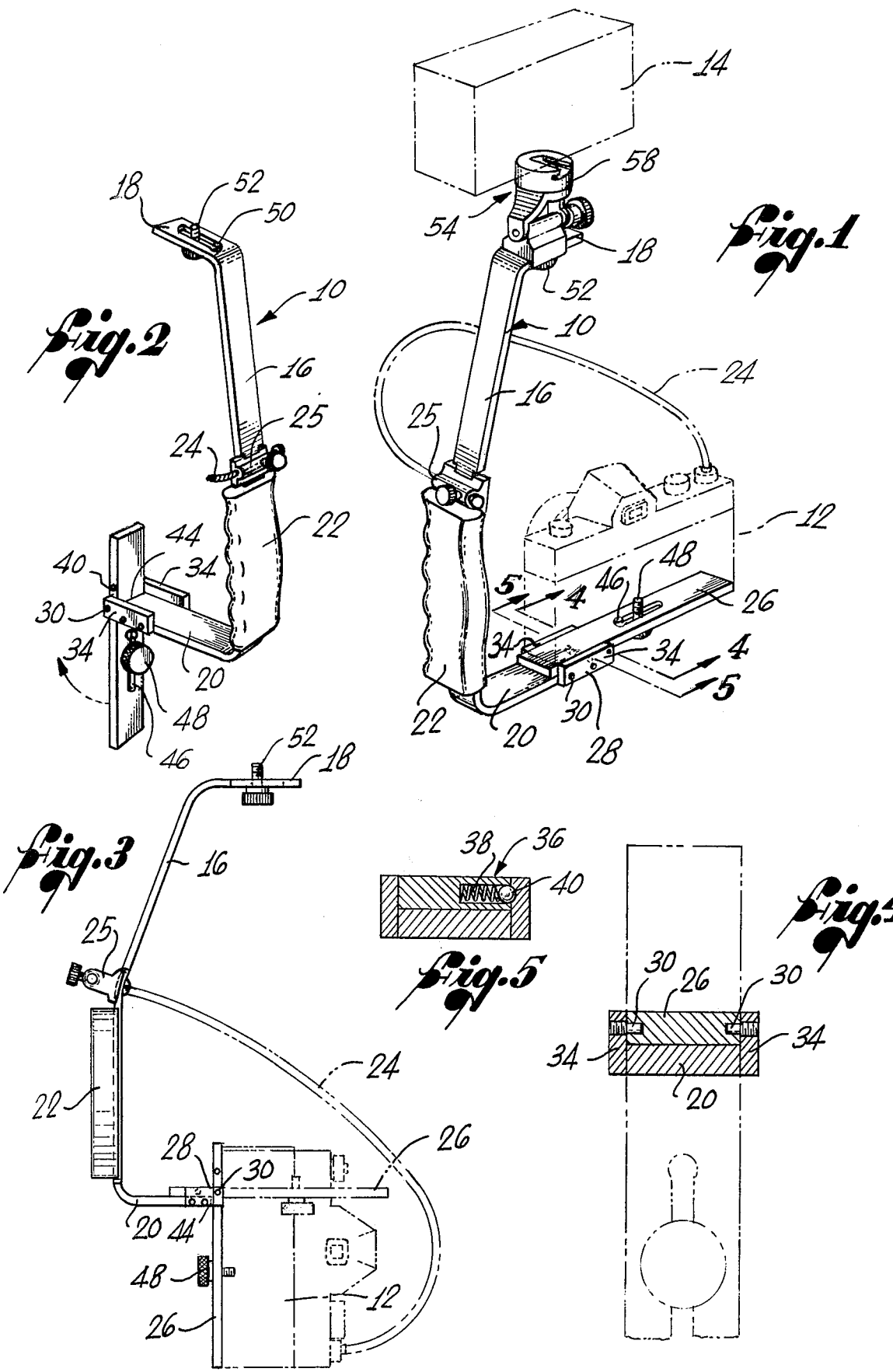

HANDHELD SUPPORT FOR CAMERA AND PHOTOGRAPHIC LAMP

BACKGROUND OF THE INVENTION

The present invention relates to photography and, more particularly, to a handheld support for a camera and photographic lamp.

Most cameras are provided with a shoe by which a flash attachment can be attached to the camera and supported directly above it when the camera is held in its normal shooting position. A problem arises, however, in connection with cameras that use a film of rectangular format. It is often desired to rotate such cameras ninety degrees so that the film will better accommodate the subject to be photographed. The lamp then extends to one side of the camera rather than above it, which can result in unflattering shadows and undesired reflections, especially when portraits are taken.

No completely satisfactory solution to this problem has been offered. Sometimes lamps that are not attached to the camera can be positioned at will. Such lamps and the necessary supports, however, are not always available, require considerable set up time and are relatively inconvenient to use. Another solution has been to rotatably mount the camera below the lamp. This apparatus can, however, be cumbersome and it is often found that the lamp is not properly centered over the lens after camera rotation.

It is an objective of the present invention to overcome the above problem by providing a device that permits a camera to be reoriented without changing the position of a lamp attached to the camera, at the same time retaining the centered position of the lamp.

SUMMARY OF THE INVENTION

The invention resides in a handheld camera and photographic lamp support that allows the lamp to be maintained in a position vertically above the camera while the camera is rotated to assume positions angularly displaced from each other by ninety degrees. It employs a handle that is grasped by one hand and held in a generally vertical position, an upper arm that extends horizontally from the handle, and a base plate connected to the handle beneath the upper arm and pivotable between horizontal and vertical positions. The lamp is secured to the upper arm and the camera is secured to the base plate. Preferably, the base plate can be releasably secured in a horizontal position by a detent mechanism or it can be lowered into a vertical position in which its motion is arrested by a stop.

The attachment of the camera and the lamp to the support can be made adjustable permitting a relationship in which the lamp is properly centered over the lens without further adjustment regardless of the camera orientation chosen.

A preferred form of the support utilizes a C-shaped member having a vertical center section along which the handle extends, with upper and lower arms projecting horizontally from the center section at its opposite ends. The base plate is pivotably attached to the lower arm by a hinge.

The upper arm and base plate can be slotted longitudinally with the attachment devices for the camera and lamp being adjustably positioned in the slots. Preferably, the lamp is aligned vertically with the lens of the camera. A clamp for attachment of a cable release can be provided at the top of the handle.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a support for a camera and lamp constructed in accordance with the present invention, the accompanying camera and lamp being shown in phantom outline;

FIG. 2 is a perspective view of the support alone, illustrated from a different perspective to show its opposite side;

FIG. 3 is a plan view of the support, the base plate and camera being shown in phantom lines in a different position;

FIG. 4 is an enlarged, fragmentary, cross-sectional view of the support, taken along the line 4—4 of FIG. 1, showing the base plate in solid lines in a horizontal position and in phantom lines in a vertical position; and FIG. 5 is another enlarged, fragmentary, cross-sectional view of the support taken along the line 5—5 of FIG. 1 to show the detent mechanism.

DESCRIPTION OF THE PREFERRED EMBODIMENT

An exemplary support 10, illustrate in FIGS. 1—5, embodies many novel features of the present invention. It holds a camera 12 and a conventional flash attachment 14 or other photographic lamp with the lamp positioned directly above the camera.

The support 10 itself includes a generally C-shaped aluminum bar which, when held in the position in which it is normally used, has a vertical center section 16. An integrally formed upper arm 18 extends horizontally from the top of the center section 16, while a shorter integrally formed lower arm 20 extends from the bottom of the center beneath the upper arm. The center section 16 carries a handle 22 shaped and dimensioned to be readily grasped by one hand. To facilitate a frim grip, a row of individual finger grip depressions 23 (best shown in FIG. 2) is formed on the handle 22 aligned with the front of the camera 14. A cable release 24 for the camera 12 is secured by a clamp 25 at the top of the handle 22.

A base plate 26, in the form of a flat rectangular aluminum piece, is connected to the outer end of the lower arm 20 by a hinge 28 formed by two hinge pins 30 that extend inwardly into sockets in the plate (as best shown in FIG. 4). The pins 30 are held by flanges 34 that project upwardly along both sides of the lower arm 20 at its outer end so that the plate 26, when in a horizontal position (as shown in FIGS. 1, 4 and 5), is received between the flanges.

A resilient detent mechanism 36 (best shown in FIG. 5) serves to lock the base plate in a horizontal position in which it extends below the outer portion of the upper arm forming a linear extension of the lower arm. The detent mechanism includes a bore 38 extending partway across the base plate 26 and a ball 40 trapped within the bore that normally projects partly from the side of the plate. A spring 42 biases the ball 40 outwardly toward its normal position to engage a recess in one of the flanges 34 when the plate 26 is horizontal. To release the detent mechanism 36, a sharp tug is applied to the outer end of the base plate 26, causing it to pivot downwardly. When the base plate 26 reaches a position in which it extends directly perpendicular to the lower arm in a vertical orientation (as shown in FIGS. 2 and 3), a stop formed by the outer end surface 44 of the lower arm 20 arrests the base plate and prevents further rotation. The base plate 26 thus has two secure positions, one horizontal and the other vertical.

A longitudinal slot 46 that receives an attachment screw 48 extends along the base plate 26. With the base plate 26 in its horizontal position, the threaded end of the screw 48 extends upwardly to engage the threaded opening normally provided in the bottom of the camera 14 and a knurled head is located on the opposite side of the plate, connected to the threaded portion by a neck of reduced diameter. The ability of the attachment screw 48 to slide longitudinally along the slot 46 permits the position of the camera 12 to be changed relative to the handle 22.

A similar longitudinal slot 50 (shown in FIG. 2) is provided in the upper arm 18 to receive a lamp attachment screw 52. The lamp 14 can, therefore, be mounted on the top surface of the upper arm 18 and its position relative to the center section 16 can likewise be adjusted.

Most flash units must be used with a shoe and cannot directly receive the screw 52. A conventional adapter bracket 54 (shown in FIG. 1) is, therefore, provided having a threaded opening that receives the screw and a conventional shoe on its upper side that receives the lamp 14. In this case, the bracket 54 has a base 56 that is directly secured by the screw 52 and an upper portion 58 that receives the lamp 14. The upper portion 58 can be rotated backwardly (as indicated by the arrow A in FIG. 1) to direct a bounce flash upwardly.

It is most desirable that the camera 12 and the lamp 14 be adjusted so that the lamp is always positioned directly over the camera lens regardless of the camera orientation chosen for a particular exposure. This is accomplished by securing the camera 12 at a location on the slot 46 so that the lens center, with the base plate 26 in a horizontal position, is vertically aligned with the lens center with the base plate in vertical position. Then the lamp 14 is positioned on the slot 50 so that it lies on the lens center line. It is thus possible to move the camera 12 back and forth between its two orientations without further adjustment and the lamp 14 will always be in the proper vertically aligned position.

It will be noted that once the camera 12 is in place, the base plate 26 of the support 10 can readily be moved between its two positions, angularly displaced by ninety degrees to take best advantage of a rectangular film format. Whichever camera orientation is chosen, the lamp 14 always remains directly above the camera 12 in the position most frequently desired. The support 10 is simple, inexpensive to manufacture, easy to use, lightweight, compact and should be trouble-free. It can be used with a wide variety of cameras and lamps, especially in view of the slots 46 and 50 that permit adjustment of the camera and lamp positions.

While particular forms of the invention have been illustrated and described, it will also be apparent that various modifications can be made without departing from the spirit and scope of the invention.

I claim:

1. A handheld support for a camera and photographic lamp comprising:

a generally C-shaped member having a vertical center section and upper and lower horizontal arms extending therefrom, said upper arm defining a slot extending longitudinally therealong;

said center section including a handle adapted to be grasped by one hand, said handle having a row of vertically spaced finger grips thereon;

lamp attachment means carried by said upper arm, received by said slot, and movable therealong to adjustably position a lamp;

an elongated rectangular base plate having a slot extending longitudinally therealong, said slots being located relative to each other and said hinge means so that, when said lamp and said camera are properly adjusted relative to each other for one orientation of said camera, said camera may be pivotally reoriented without requiring readadjustment of said lamp relative to said camera to retain the centered position of said lamp;

camera attachment means received by said slot in said base plate for adjustably positioning a camera;

hinge means for pivotably connecting said base plate to said lower arm;

detent means for releasably securing said base plate in a horizontal position;

stop means for arresting said base plate in a vertical position; and clamp means adjacent the top end of said handle portion for securing a cable release thereto.

2. A handheld support for a camera and photographic lamp comprising:

a generally C-shaped member having a vertical center section and upper and lower horizontal arms extending therefrom, said upper arm defining a slot extending longitudinally therealong, and said center section including a handle adapted to be grasped by one hand;

lamp attachment means carried by said upper arm, received by said slot, and movable therealong to adjustably position a lamp;

a base plate having a slot extending longitudinally therealong, said slots being located relative to each other and said hinge means so that, when said lamp and said camera are properly adjusted relative to each other for one orientation of said camera, said camera may be pivotally oriented without requiring readjustment of said lamp relative to said camera to retain the centered position of said lamp;

camera attachment means received by said slot in said base plate for adjustably positioning a camera;

hinge means for pivotably connecting said base plate to said lower arm;

detent means for releasably securing said base plate in a horizontal position; and stop means for arresting said base plate in a vertical position.

3. A handheld support for a camera and photographic lamp comprising:

a generally C-shaped member having a vertical center section and upper and lower horizontal arms extending therefrom, said upper arm defining a slot extending longitudinally therealong;

said center section including a handle adapted to be grasped by one hand, said handle having a row of vertically spaced finger grips thereon;

lamp attachment means carried by said upper arm, received by said slot, and movable therealong to adjustably position a lamp;

an elongated rectangular base plate having a slot extending longitudinally therealong, said slots being located relative to each other and said hinge means so that, when said lamp and said camera are properly adjusted relative to each other for one orientation of said camera, said camera may be pivotally reoriented without requiring readjustment of said lamp relative to said camera to retain the centered position of said lamp;

camera attachment means received by said slot in said base plate for adjustably positioning a camera;

hinge means for pivotably connecting said base plate to said lower arm;

detent means for releasably securing said base plate in a horizontal position; and stop means for arresting said base plate in a vertical position.

* * * * *